United States Patent [19]
Moseley, III et al.

[11] Patent Number: 5,358,208
[45] Date of Patent: Oct. 25, 1994

[54] DEVICE FOR HOLDING A COMPUTER PAD

[76] Inventors: Lehman A. Moseley, III, 6005 Ashwood Rd., Columbia, S.C. 29206; Robert E. Buck, IV, 124 E. Selwood La., Columbia, S.C. 29212; Michael B. Baker, 240 Turkey Farm Rd., Blythewood, S.C. 29016

[21] Appl. No.: 993,237

[22] Filed: Dec. 17, 1992

[51] Int. Cl.⁵ .................................. A47B 5/04
[52] U.S. Cl. ..................... 248/441.1; 248/174; 248/918
[58] Field of Search ............... 248/441.1, 444.1, 445, 248/453, 118, 118.1, 174, 918; D6/310; 400/715; D14/114

[56] References Cited
U.S. PATENT DOCUMENTS

| | | | |
|---|---|---|---|
| D. 289,346 | 4/1987 | Arato | D6/310 |
| 4,073,460 | 2/1978 | Dale | 248/174 X |
| 5,209,452 | 5/1993 | Goldberg | 248/174 X |

*Primary Examiner*—Ramon O. Ramirez
*Attorney, Agent, or Firm*—Michael A. Mann

[57] ABSTRACT

A device that holds a mouse pad and provides a second elevation or surface above the pad for another object such as a book or work papers in order to make better use of space on a desk. The device is preferably made of a single segment of material folded in three places to form and separate the two elevations and provide a lip for the upper elevation which is sloped so that the object on that elevation can be more easily seen. The device has a hole for a cable from the mouse on the mouse pad to pass through to the computer and may have a recess dimensioned for the mouse pad. Alternatively, an adhesive may be provided so that the mouse pad does not slip from the lower elevation. Small friction pads are placed on the underside of the lower level to prevent the device from slipping from the desk surface.

12 Claims, 2 Drawing Sheets

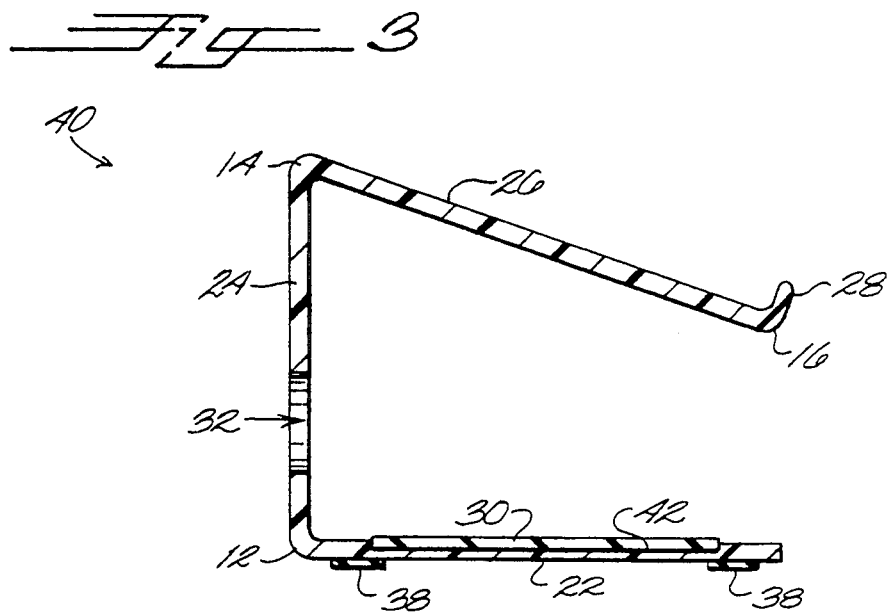

DEVICE FOR HOLDING A COMPUTER PAD

BACKGROUND OF THE INVENTION

1. Field of the Invention

The present invention relates to devices for holding objects for the convenience of a user. More particularly, the present invention is a device for holding a computer pad, of the type used with a computer "mouse," on a lower level and holding another object simultaneously on a different level.

2. Discussion of Background

Personal computers have proliferated to the point where they can be found on nearly every desk in businesses. In some businesses, they are indispensable. However, and notwithstanding improvements in reducing the size of personal computers, they still take up space on a desk.

In addition to the space occupied by the computer——and the usual things found on desks—, space is required for a computer "mouse," a device for inputting various signals such as the desired location of a cursor in word processing programs, by movement of the mouse on a horizontal surface. The mouse comprises a palm-sized casing and a cable extending from the back of the mouse to the computer. The mouse partially encloses a ball used for making a correspondence between where on a computer monitor screen and user wishes to make his input and the location of the mouse. A portion of the ball is visible and extends slightly from the bottom of the casing so that the ball can engage the surface. The ball rotates freely and is rotated as desired by moving the mouse, ball side down, on a surface with sufficient friction to cause the ball to rotate within the casing. When a desk surface is too smooth to provide the needed friction, a mouse is placed on a "mouse pad" for moving. A mouse pad, or computer pad, is a square or rectangular piece of textured surface that prevents the ball from sliding on a too slippery desk surface by providing the needed friction.

Thus, the computer, the mouse pad, and all of the other items compete for the desk surface space available. There is a need for making better use of desk space.

SUMMARY OF THE INVENTION

According to its major aspects, the present invention is a device for supporting a mouse pad on a first, lower level, and another object such as a book on a second level above the first level. The device comprises a piece or segment of material folded three times to form four adjacent, integral portions. Two of the portions, namely, a first and a third portion, define the first and second elevations; another portion, the second portion, lays between them and separates them by a distance sufficient so that a mouse on the mouse pad can be moved by the user without interference from the second level. The fourth portion forms a lip at the end of the second level, which is preferably sloped with respect to the first level when the first level is placed on a horizontal surface, so that the object on the second level does not easily slide off. The first portion may have a recess or an adhesive material to hold the mouse pad. Them is a hole formed in the second portion for the mouse cable to pass through in its return to the computer. Preferably, the device is made of molded, rigid plastic.

A feature of the present invention is the use of a single segment of plastic to form two levels, each of-which is capable of holding an object and together forming a vertical array of two surfaces so that the same portion of desk space can be used for two functions simultaneously, thus saving desk space. The single, folded segment eliminates assembly requirements and provides a sleeker appearance.

Another feature of the present invention is the combination of the third and fourth segments which serve as the second elevation and the lip, respectively. The second elevation is sloped so that the object on it can be seen as easily as an object directly on the desk surface. The lip prevents this object from sliding off.

Still another feature of the present invention is the hole in the back of the second portion for the mouse cable. This hole not only enables the cable to return to the computer by a more direct route but helps to hold the mouse in place on the pad better.

Other features and advantages of the present invention will be apparent to those skilled in the art from a careful review of the Detailed Description of Preferred Embodiments of the present invention accompanied by the following drawings.

BRIEF DESCRIPTION OF THE DRAWINGS

In the drawings:

FIG. 3 is an alternative cross sectional view of a device according to a preferred embodiment of the present invention; and FIG. 4 is another alternative cross sectional view of a device according to a preferred embodiment of the present invention.

DETAILED DESCRIPTION OF A PREFERRED EMBODIMENT

The present invention is a device in combination with a mouse pad and that provides a second surface or elevation above the pad for holding an additional object, such as an open book or work papers.

Figure 1:
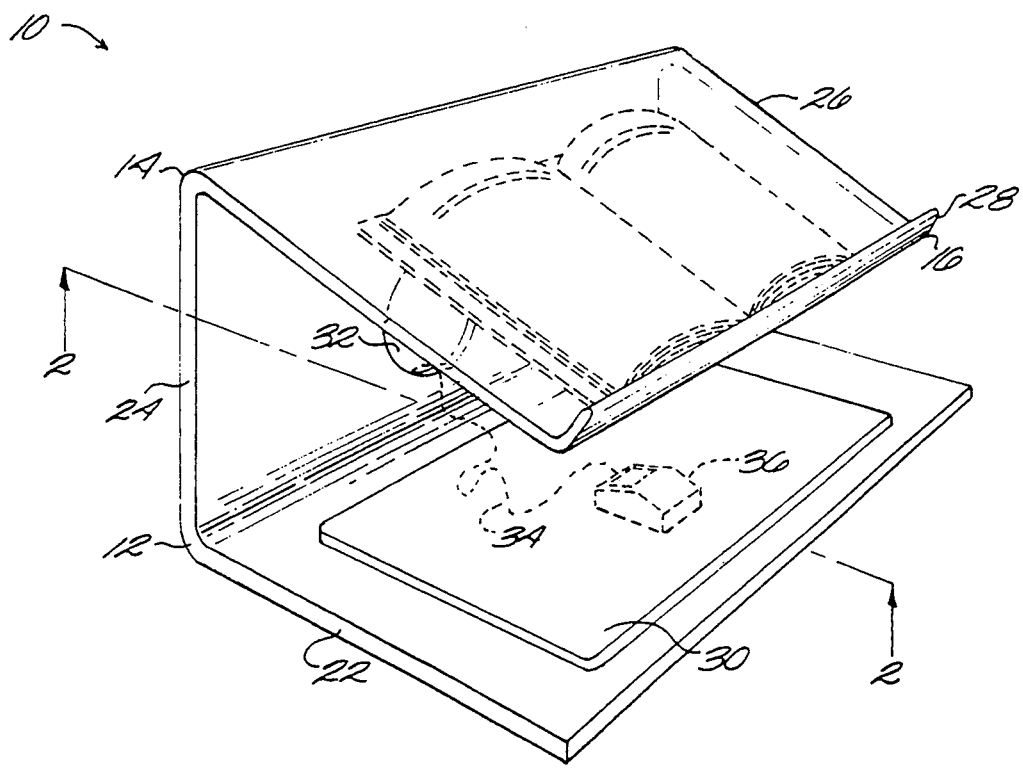
FIG. 1 is a perspective view of a device according to a preferred embodiment of the present invention.
Figure 2:
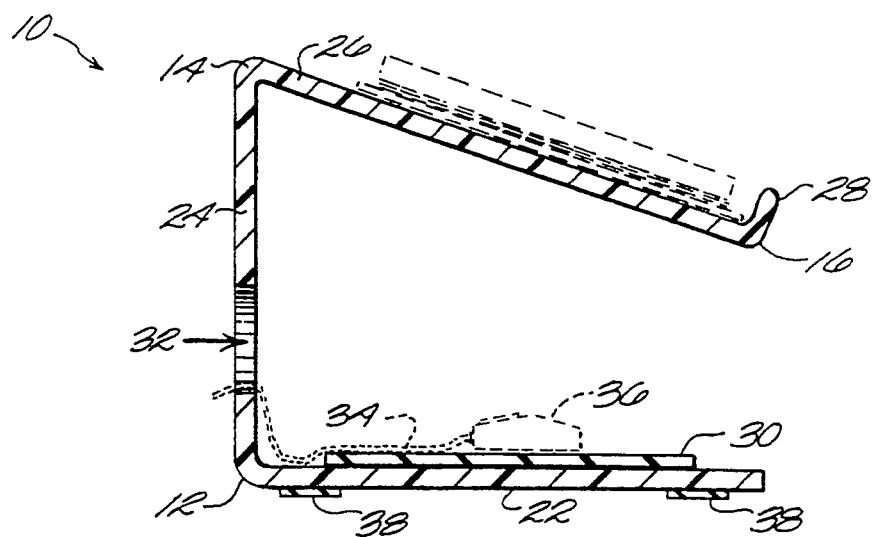
FIG. 2 is a cross sectional view of the device of FIG. 1 taken along lines 2—2.

A device according to a preferred embodiment of the present invention is shown in FIGS. 1 and 2. The device, generally indicated by reference numeral 10, comprises a single segment of material, preferably a rigid, moldable material such as a plastic. "Segment" means a generally rectangular piece of material. The segment has at least three bends or folds: a first fold 12, a second fold 14, and a third fold 16, that define at least four portions. First fold 12 defines first portion 22, second fold 14 defines second portion 24, third fold 16 defines third and fourth portions 26 and 28, respectively.

A fold is a defined as a place where the segment bends from the plane of the previous portion toward the plane of the next portion. The angles between the planes defined by these portions will vary. Second portion 24 is preferably at right angles to first portion 22 but may be at any angle that results in a separation of first and third portions 22, 26 and preferably one that results in third portion 26 being essentially directly above first portion 22 for stability, although it will be clear that in providing additional surface space for items required on a desk, third portion 26 can be larger, smaller, off to one side with respect to the first portion 22 or directly over it.

Third portion 26 is preferably sloped so that third fold 16 is closer to first portion 22 than second fold 14. Because third portion 26 is elevated with respect to first portion 22, it will be easier for the user to read a book laying on third portion 26 if it is sloped. If third portion 26 is sloped, forth portion 28 is required and forms a lip to prevent the book from sliding off sloped third portion 26.

First portion 22, when placed on a desk, and therefore in a horizontal position, defines a first elevation. Third portion 26 then defines a second, upper elevation. A mouse pad 30 is placed on first elevation and another object, such as a book, work papers, a telephone, an so forth, on the upper elevation. A hole 32 is formed in second portion 24 for a cable 34 from a mouse 36 to pass through in its return to a computer (not shown).

In a preferred embodiment, small pads 38 are placed on the underside of the four corners of first portion 22. Pads 38 are preferably a material that both cushions the surface of desk and device 10 and also frictionally engage the desk, such as a synthetic or natural rubber.

In FIG. 3 is shown a device 40 according to an alternative embodiment of the present invention where parts of device 40 that correspond to the parts of the device shown in FIGS. 1 and 2 are identified with the same reference numerals. In particular, first portion 22 of device 40 has a recess 42 dimensioned to receive mouse pad 30 and thus hold it place better.

In FIG. 4 is shown a device 50 according to yet another alternative embodiment of the present invention. Again the parts of device 50 that correspond to the parts of the device shown in FIGS. 1 and 2 are identified with the same reference numerals. Device 50 has an adhesive layer 52 consisting of one or more double-sided tapes or a layer of adhesive on which the pad is placed to prevent it from sliding.

Device 10 (as well as devices 40 and 50) are preferably made of a plastic, and most preferably made of a clear or translucent plastic so that the mouse can be seen through the second elevation. The distance between the first and second elevation should be just great enough to allow a user's hand to be placed on the mouse and moved without interference with the upper elevation. A few inches clearance between elevations is sufficient, such as three or four inches. The overall dimensions of device 10 should be approximately that of a mouse pad or slightly larger, especially in the case of device 40, to allow the recessing of a mouse pad in second portion 22.

It will be apparent to those skilled in the art that many modifications and changes may be made to the specific embodiments described above without departing from the spirit and scope of the present invention. For example, it will be clear that different materials can be used and that, rather than using a single segment of material, several different segments can be fastened together. However, the present invention is broadly defined to include these modifications and changes by the appended claims.

What is claimed is:

1. A device for supporting a first object and a second object, said device comprising a segment of material having three folds, said three folds forming four integral, sequential portions including a first portion defining a first elevation, a second portion adjacent to said first portion, a third portion adjacent to said second portion and oriented and held by said second portion with respect to said first portion so that said third portion is sloped when said first portion is horizontal, said third portion defining a second elevation a distance above said first elevation, and a fourth portion defining a lip adjacent to said third portion, said second portion elevating said second elevation above said first elevation so that a first object can be placed on said first elevation and a second object can be placed on said second elevation, said second portion having means formed therein dimensioned for passing a cable through said second portion.

2. The device as recited in claim 1, wherein said passing means is a throughhole dimensioned to pass a cable.

3. The device as recited in claim 1, wherein said first portion has a recess formed therein dimensioned to receive a computer pad.

4. The device as recited in claim 1, further comprising a computer pad and wherein said first portion has a recess formed therein dimensioned to receive said computer pad.

5. The device as recited in claim 1, wherein said material is plastic.

6. A device for use with a computer "mouse," said device comprising:

a segment of material having at least two folds, said at least two folds forming at least three integral, sequential portions including a first portion defining a first elevation, a second portion adjacent to said first portion, and a third portion adjacent to said second portions, said third portion held by said second portion with respect to said first portion so that said third portion defines a second elevation a distance above said first elevation, said second portion elevating said second elevation above said first elevation, said second portion having means formed therein dimensioned for passing a cable through said second portion; and a computer pad dimensioned for said computer "mouse" positioned on said first elevation.

7. The device as recited in claim 6, further comprising an adhesive adhering said computer pad to said first portion.

8. The device as recited in claim 6, wherein said first portion has a recess formed therein dimensioned to receive said computer pad.

9. The device as recited in claim 6, wherein said computer "mouse" has a cable and said passing means is a throughhole dimensioned for said cable to pass therethrough.

10. The device as recited in claim 6, wherein said second portion holds said third portion so that said third portion is sloped with respect to said first portion when said first portion is horizontally oriented and said at least two folds is three folds and said at least three portions is four portions, said fourth portion forming a lip with respect to said sloped third portion.

11. The device as recited in claim 6, wherein said material is plastic.

12. A device for use with a computer "mouse," said device comprising:

a segment of material having three folds, said three folds forming four integral, sequential portions including a first portion defining a first elevation, a second portion adjacent to said first portion, a third portion adjacent to said second portion and oriented and held by said second portion with respect to said first portion so that said third portion is sloped when said first portion is horizontal, said third portion defining a second elevation a distance above said first elevation, and a fourth portion defining a lip adjacent to said third portion, said second portion elevating said second elevation above said first elevation so that a first object can be placed on said first elevation and a second object can be placed on said second elevation, said first portion having a top side and an opposing bottom side, said second portion having a throughhole;

a computer pad dimensioned for said computer "mouse" carried by said top side of said first portion; and a plurality of pads carried by said bottom said of said first portion.

* * * * *